1

(12) United States Patent
Bourbonnais et al.

(10) Patent No.: US 10,169,409 B2
(45) Date of Patent: Jan. 1, 2019

(54) SYSTEM AND METHOD FOR TRANSFERRING DATA BETWEEN RDBMS AND BIG DATA PLATFORM

(71) Applicant: International Business Machines Corporation, Armonk, NY (US)

(72) Inventors: Serge Bourbonnais, Palo Alto, CA (US); Hong Min, Poughkeepsie, NY (US); Xiao Li, San Jose, CA (US); Gong Su, New York, NY (US); Ke Wei Wei, Beijing (CN); Xi Long Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 14/872,618

(22) Filed: Oct. 1, 2015

(65) Prior Publication Data

US 2017/0097957 A1    Apr. 6, 2017

(51) Int. Cl.
*G06F 17/30* (2006.01)

(52) U.S. Cl.
CPC .. *G06F 17/30445* (2013.01); *G06F 17/30297* (2013.01); *G06F 17/30486* (2013.01)

(58) Field of Classification Search
CPC ......... G06F 17/30445; G06F 17/30297; G06F 17/30486
See application file for complete search history.

(56) References Cited

U.S. PATENT DOCUMENTS 7,146,365 B2    12/2006    Allen et al.
8,140,522 B2    3/2012     Min et al.

| 2004/0148293 | A1* | 7/2004 | Croisettier | G06F 17/30336 |
| 2011/0252020 | A1* | 10/2011 | Lim | G06F 17/30442 707/721 |
| 2012/0059823 | A1* | 3/2012 | Barber | G06F 17/30584 707/737 |

(Continued)

OTHER PUBLICATIONS

Ordonez, Carlos, "Can we analyze big data inside a DBMS?" Proceedings of the sixteenth international workshop on Data warehousing and OLAP, ACM, 2013. (Year: 2013).*

Xu et al., "Integrating hadoop and parallel dbms," Proceedings of the 2010 ACM SIGMOD International Conference on Management of data, ACM, 2010. (Year: 2010).*

(Continued)

*Primary Examiner* — Jay A Morrison
(74) *Attorney, Agent, or Firm* — Scully, Scott, Murphy & Presser, P.C.; Rabin Bhattacharya (57) ABSTRACT

A system for transferring data from a Relational Database Management System ("RDBMS") to a big data platform and methods for making and using the same. The system can acquire a partitioning execution scheme of a selected table from the RDBMS and submitting partitioned queries from the big data platform to each mapper of partitions. The partitioned queries are generated based on the partitioning execution scheme. The partitioning execution scheme can be acquired by submitting a query explain request to an optimizer of the RDBMS to generating a parallel query plan. The partitioning execution scheme can also be acquired by querying statistics from a statistics catalog of the RDBMS or by user inputs. The system can use RDBMS capabilities and statistics for parallel data fetching. Thereby, the system can increase efficiency of the fetching and can avoid straggling when target data is not evenly distributed and can avoid table query-in-serial.

12 Claims, 7 Drawing Sheets

(56) References Cited

U.S. PATENT DOCUMENTS

| | | | |
|---|---|---|---|
| 2013/0073538 A1* | 3/2013 | Beerbower | G06F 17/30545 707/718 |
| 2013/0173594 A1* | 7/2013 | Xu | G06F 17/30584 707/722 |
| 2013/0318119 A1 | 11/2013 | Dalal | |
| 2014/0025658 A1* | 1/2014 | Thiyagarajan | G06F 17/30292 707/713 |
| 2015/0095308 A1* | 4/2015 | Kornacker | G06F 17/30448 707/718 |
| 2016/0092545 A1* | 3/2016 | Shivarudraiah | G06F 17/30584 707/600 |
| 2016/0378824 A1* | 12/2016 | Li | G06F 17/30445 707/715 |

OTHER PUBLICATIONS

Stonebraker et al., "MapReduce and parallel DBMSs: friends or foes?" Communications of the ACM, 2010. (Year: 2010).*

LeFevre et al., "MISO: souping up big data query processing with a multistore system," Proceedings of the 2014 ACM SIGMOD international conference on Management of data, ACM, 2014. (Year: 2014).*

Yxu, "Hadoop MapReduce Connector to Teradata EDW", Teradata Developer Exchange, article by Yxu, Dylan on Oct. 15, 2010; retrieved from Internet, https://developer.teradata.com/print/6818, last printed Oct. 1, 2015, pp. 1-7.

Apache Sqoop, retrieved from Internet, http://sqoop.apache.org, Copyright© 2011-2015, last printed Oct. 1, 2015, p. 1 of 1.

Spark Lightning-fast cluster computing, retrieved from Internet, http://spark.apache.org, last printed Oct. 1, 2015, pp. 1-4.

* cited by examiner

SYSTEM AND METHOD FOR TRANSFERRING DATA BETWEEN RDBMS AND BIG DATA PLATFORM

FIELD

The present disclosure relates generally to data transfer and more specifically, but not exclusively to, systems and methods of transferring big data between an RDBMS and a big data platform in a parallel manner.

BACKGROUND

Transferring table data between a Relational Database Management System ("RDBMS") and a big data platform can be time consuming because of a large size of the table data. The big data refers to a massive value of both structured and unstructured data that is too large to process using traditional database techniques, e.g. a query-in-serial. The big data platform, such as Hadoop and Spark, usually adopts a distributed storage architecture (or a distributed file system) and a distributed processing architecture. Tools are usually available for transferring big data from the RDBMS to the file system of the big data platform, e.g. Sqoop is provided for Hadoop. But these tools are unable to solve the issue of time consuming.

The big data platforms attempt to achieve performance and scalability by partitioning the table data into chunks for parallel tasks. One mechanism for such parallel transferring is to submit Structured Query Language ("SQL") statements for querying the RDBMS via a java connectivity tool called Java Database Connectivity ("JDBC") interface. Each of the SQL statement maps to a partition of the table data. By concurrently submitting the partitioned SQL statements with parallel tasks, high throughput data transfer can be achieved.

Currently-available parallel data transferring approaches implement one of two approaches to partition a transfer query. One approach used by Sqoop is to evenly partition key value ranges for each partitioned query. This approach can create an issue of straggling among the parallel tasks when the table data is not evenly distributed, commonly known as "skew", within the key ranges. A second approach, which can handle the issue of straggling better, is designed to pre-execute a query, before the data transfer, for counting a number of rows. The approach identifies sizes, in the number of rows, for each parallel task, and uses nonstandard SQL syntax to locate logical starting point for each parallel task. However, the pre-executed query is often an expensive one because of a "sort operation" needed to guarantee a consistent result.

In view of the foregoing reasons, there is a need for systems and methods for transferring table data from the RDBMS to the big data platform without straggling or incurring an expensive query.

SUMMARY

In accordance with a first aspect disclosed herein, there is set forth a method for transferring data from a Relational Database Management System ("RDBMS") to a big data platform. The method comprises acquiring a partitioned execution scheme of a selected table from the RDBMS; generating partitioned queries, with partition mappers, based on the acquired partitioned execution scheme; and submitting partitioned queries from the big data platform via the partition mappers.

In accordance with another aspect disclosed herein, there is set forth a system for transferring data. The system comprises: a relational database with one or more query engines for executing parallel queries; one or more big data platforms for storing big data in a distributed configuration; and a connectivity driver for fetching a selected table from the RDBMS, or from a result of a query to the RDBMS, to the big data platforms, wherein the selected table is transferred to the big data platform in parallel with multiple tasks, and wherein the connectivity driver is configured to consult the RDBMS for a partitioned execution scheme before the parallel transfer.

In a further aspect, there is provided a computer program product for performing operations. The computer program product includes a storage medium readable by a processing circuit and storing instructions run by the processing circuit for running a method. The method is the same as listed above.

DETAILED DESCRIPTION

Since currently-available systems for transferring target table data from a Relational Database Management System ("RDBMS") to a big data platform, in a parallel manner, can result in straggling or involve an expensive query, a parallel data transferring system and method that does not result in straggling and eliminates the expensive query can prove desirable and provide a basis for an efficient data transferring mechanism. These results can be achieved, according to one embodiment disclosed herein, by a method 100 as illustrated in FIG. 1.

Figure 1:
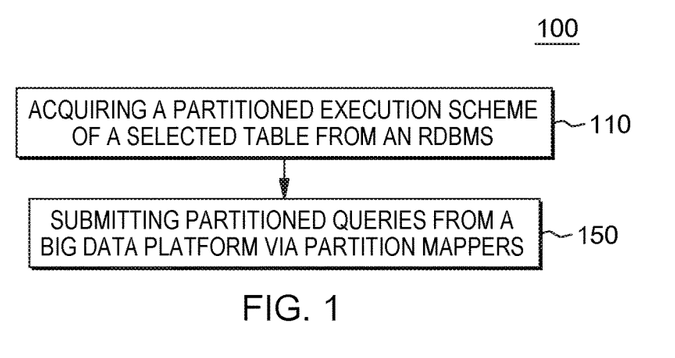
FIG. 1 is an exemplary top-level flowchart illustrating an embodiment of a data transferring method, wherein a partitioned execution scheme is acquired for submitting partitioned queries.

FIG. 1 illustrates an exemplary embodiment of a method 100, wherein a partitioned execution scheme is acquired before partitioned queries are submitted. The partitioned queries (or parallel queries) can be acquired based on the partitioned execution scheme. In FIG. 1, the big data platform 130 can determine the partitioned execution scheme based on information acquired from the Relational Database Management System ("RDBMS") 120 (collectively shown in FIGS. 3 and 4), at 110, before executing a fetch task of a selected table from the RDBMS 120 to the big data platform 130. In some embodiments, an independent process can collect the information from the RDBMS 120 in order to acquire the partitioned execution scheme.

The partitioned execution scheme can be useful in determining how to fetch the selected table in an efficient manner (or an optimized manner). The partitioned execution scheme can include, but is not limited to, one or more columns of the selected table as partitioning columns and boundary values for each partition (or chunk) for defining the partitions. The one or more partitioning columns and the boundary values can be used for constructing the partitioned queries that can be executed in parallel tasks. Alternatively or additionally, the partitioned execution scheme can include relevant information for determining the partitioning columns and/or the boundary values, e.g. data distribution of the selected table. Additional detail regarding how to acquire the partitioned execution scheme will be shown and described below with reference to FIGS. 2-10.

Although shown and described as transferring data from the selected table for purposes of illustration only, the method 100 can be used to transfer data from a selected view or selected index to the big data platform 130.

At 150, the partitioned queries can be submitted from the big data platform 130 via mappers corresponding to each partition of the selected table. The partitioned queries can be generated based on the partitioned execution scheme that includes the one or more columns and/or the boundary values. Construction of the partitioned queries will be discussed in additional detail below with reference to FIG. 4. Although shown and described as being submitted from the big data platform 130 for purposes of illustration only, the submission can also be initiated from any suitable platforms, including but not limited to any computer applications. Additional detail of the submission will be shown and described below with reference to FIG. 4.

Although shown and described as including the partitioning columns and/or the boundary values for purposes of illustration only, the partitioned execution scheme can also include other suitable one or more parameters, depending on an optional approach for acquiring the scheme and an actual configuration of the RDBMS 120 and/or the big data platform 130.

The method 100 disclosed herein can take advantages of the partitioned queries to realize efficient parallel big table data fetching from the RDBMS 120 to the big data platform 130. In addition, the relevant information, contained in the partitioned execution scheme, available in the RDBMS 120 can be used to determine the partitions and the partitioned queries. Because the information contained in the partitioned execution scheme can reflect the data distribution of the selected table, the partitioned queries determined based on the information can avoid stragglers in case of uneven data distribution or skewed data. Moreover, the query to the RDBMS 120 for acquiring the partitioned execution scheme can be a cost-effective one compared to a pre-execution query being used in some of current-available parallel fetching approaches.

Figure 2:
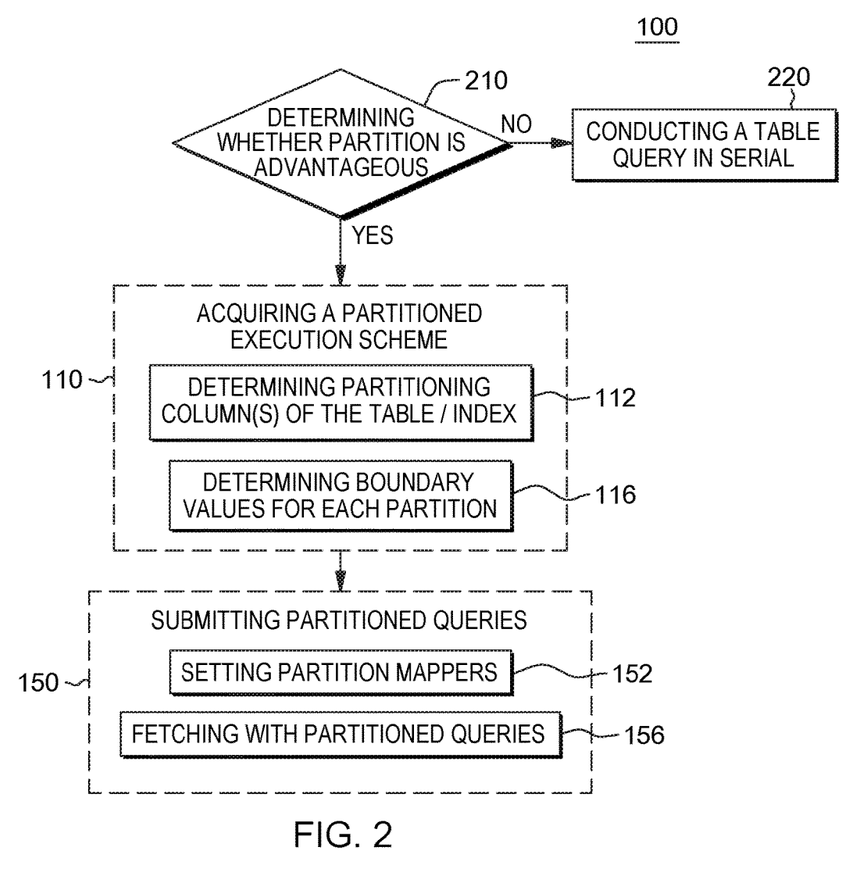
FIG. 2 is another exemplary top-level flowchart illustrating an alternative embodiment of the method of FIG. 1, wherein the method determines whether the partitioned queries are advantageous.

FIG. 2 illustrates an alternative exemplary embodiment of the method 100, wherein the method 100 determines whether partitioned queries are advantageous. As described above in the background section, partitioned queries can improve efficiency of a big data fetch from a RDBMS 120 to the big data platform 130 (collectively shown in FIG. 3). In practice, the partitioned queries cannot be always advantageous for improving the efficiency for all configurations of the RDBMS 120. In certain cases, performance of the partitioned queries can be worse than the performance of a table query-in-serial. For example, in case a selected table does not have an index designed for the partitioned queries, the performance of the partitioned queries can be worse.

For purposes of determining whether the partitioned queries are advantageous, an existence of the designed index of the selected table can be determined, at 210. The designed index of the selected table can be an index created on the selected table for purposes of improving efficiency for querying the selected table. The designed index can limit the data of the selected table by introducing some criteria to filter out certain rows and/or columns. The designed index can also have been ordered to improve query efficiency by one or more columns.

When such designed index does not exist, a table query-in-serial can be performed for better efficiency, at 220. In case of a query-in-serial, the whole selected table can be queried from a start to an end in a natural order of the selected table. Although shown and described as using the designed index for purposes of illustration only, other suitable table features or database features can also be used for purposes of determining the advantage of the partitioned queries.

The partitioned queries can depend on definitions of partitions of the selected table. The partitioned queries can be created with either a manual process by a user or an automatic process, such as the Sqoop import process 160 (shown in FIG. 4). In some embodiments, the partitions of the selected table can be defined by one or more partitioning columns and/or boundary values of the partitions. Thereby, an exemplary partitioned execution scheme can comprise the one or more partitioning columns of the selected table (or view) and the boundary values for defining each partition. The partitions defined in the partitioned execution scheme can reflect, e.g. distribution characteristics of the data in the selected table, so as to distribute workloads among parallel tasks to avoid stragglers in case of an uneven distribution or skewed data.

In some embodiments, the one or more partitioning columns can be determined based on information available in the RDBMS 120, at 112. Additional detail regarding determination of the partitioning columns will be shown and described below with reference to FIG. 5. At 116, the boundary values for each partition can be determined. In some alternative exemplary embodiments, on or before the determination of the boundary values, a partition degree (or parallel degree) can be determined (not shown), according to, for example, a task degree of a big data platform 130. The partition degree can be a number of partitions that the big data platform 130 can handle in parallel in an effective manner. In these embodiments, the boundary values can be determined in accordance to the partition degree.

At 150, the partitioned queries can be generated based on the determined partitioned execution scheme and submitted to the RDBMS 120. The partitioned queries can be generated with an application program, e.g. a Java application. In some embodiments, the application program can be a process running on the big data platform 130, e.g. the Sqoop import process 160 running on a Hadoop platform. Additional detail regarding the creation of the partitioned queries will be provided below with reference to FIG. 4. In some other embodiments, the application can be independent of the big data platform 130 and/or the RDBMS 120, e.g. a Java application program implementing a Java Database Connectivity ("JDBC") interface.

In order to execute the partitioned queries, each partition identified in the partitioned queries can be set with a partition mapper, at 152. The mapper can be certain database connectivity interface handling communications with each partition of the selected table. In some embodiments, for example, the mapper can be a JDBC interface.

At 156, the partitioned queries can be submitted via the partition mappers to initiate the tasks for fetching each chunk of data defined in the partitions. The tasks can be independent to each other. In some embodiments, the tasks can be executed in a parallel manner. The partitioned queries can take advantage of a parallel execution capacity of the RDBMS 120 and/or the big data platform 130 to improve performance of the data fetch, especially when the RDBMS 120 and/or the big data platform 130 have pluralities of CPU cores for executing the parallel tasks.

Although shown and described as using partition mappers for executing the partitioned queries for purposes of illustration only, other suitable connection tools or structures can be employed for executing the partitioned queries.

Figure 3:
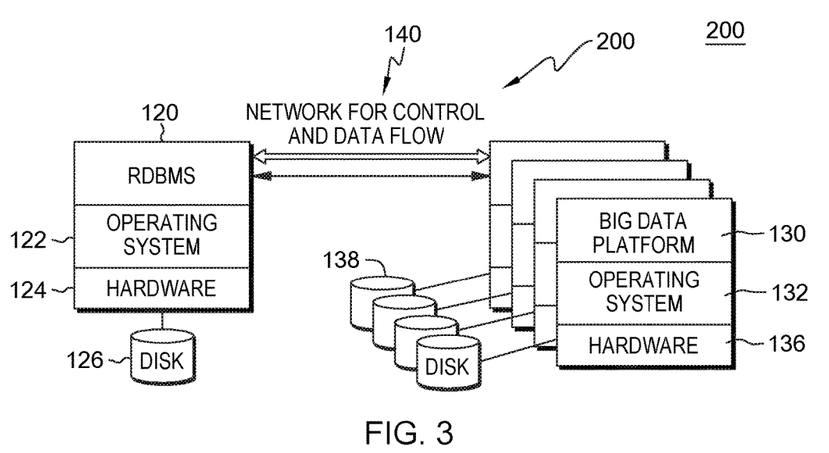
FIG. 3 is an exemplary top-level block diagram illustrating an embodiment of a data transferring system, wherein table data can be transferred from the RDBMS to the big data platform by the method of FIG. 1.

FIG. 3 shows an exemplary embodiment of a system 200, wherein a big data platform 130 fetches target table data from an RDBMS 120. In FIG. 3, the fetch of target table data can be performed in accordance with the method 100. The big data platform 130 can be associated with the RDBMS 120 via a network 140 that can be an Ethernet, a Local Area Network ("LAN"), a Wide Area Network ("WAN"), the Internet or the like. The network 140 can transfer any instructions and/or data between the big data platform 130 and the RDBMS 120. Although shown and described as using a network for purposes of illustration only, the big data platform 130 can be associated with the RDBMS 120 via any wired or wireless connections.

The RDBMS 120 can be any database management system that is based on a relational data model, including, but not limited to, IBM® DB2, IBM® Informix, Oracle® Database, MySQL, SAP Sybase® and the like. In FIG. 3, the RDBMS 120 can operate with hardware 124 via a first operating system 122. The first operating system 122 is system software that manages hardware and/or software resources and provides other services for computer applications. The first operating system 122 can comprise one of a Unix, Linux, Android, Chrome OS, Blackberry, BSD, IOS, OS X, QNS, Microsoft Windows, Steam OS and the like. In FIG. 3, the first operating system 122 can control the hardware 124 to perform write-in and/or read-out operations to and/or from the first disk 126.

The hardware 124, in FIG. 3, can consist of any tangible components to perform operations including, but not limited to, writing data into the first disk 126 and/or reading data out of the first disk 126. The first disk 126 can comprise any type of hard disks, floppy disks, optical disks, USB disks and the like. The first disk 126 can provide storage for data of any kind, which data can be retrieved and/or managed by the hardware 124.

Although shown and described as using the one first disk 126 for purposes of illustration only, the RDBMS 120 can have any number of first disks 126 for storing data for the RDBMS 120. Additionally or alternatively, other hardware or software can be included in the RDBMS 120 for performing operations described herein or other operations irrelevant to the disclosed embodiments.

In FIG. 3, the big data platform 130 can map to a plurality of second disks 138. In order to manage the plurality of second disks 128, the big data platform 130 can employ one or more second operating systems 132. The big data platform 130 can control the hardware 136 via the second operating systems 132 in order to perform write-in and/or read-out operations. Similar to description regarding the RDBMS 120, the second operating system 132 can comprise one of a Unix, Linux, Android, Chrome OS, Blackberry, BSD, IOS, OS X, QNS, Microsoft Windows, Steam OS and the like. The hardware 136 can consist of any tangible components to perform operations including, but not limited to, writing data into the second disks 138 and/or reading data out of the second disks 138. The second disks 138 can comprise any type of hard disks, floppy disks, optical disks, USB disks and the like.

Although shown as being a plurality of big data platforms 130 for purposes of illustration only, the big data platforms 130 can be one integrated platform or be associated to each other for exchanging instructions and/or data.

Different with the discussion regarding the RDBMS 120, the big data platform 130 can commonly store a piece of big data onto several second disks 138. In order to ensure an efficient and/or speedy write or read operation, the big data can be partitioned into a plurality of partitions (or chunks). The big data platform 130 can write each of the partitions into a respective second disk 138. The big data platform 130 can execute tasks for writing into each partition in a parallel manner.

Although shown and described as having the second operating systems 132, the hardware 136 and the second disks 138, the big data platform 130 can employ other hardware or software for operations either relevant or irrelevant to the operations discussed herein.

Figure 4:
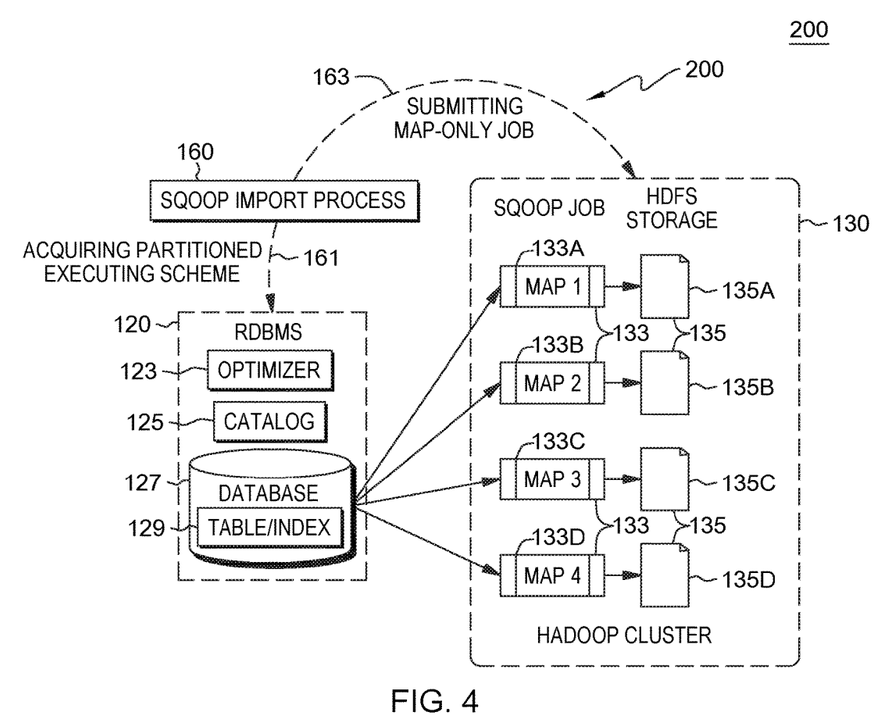
FIG. 4 is an exemplary block diagram illustrating an alternative embodiment of the system of FIG. 3, wherein a Sqoop import process queries the RDBMS for a partitioned execution scheme and submits partitioned queries to the big data platform.

FIG. 4 illustrates another exemplary embodiment of the system 200, wherein a Sqoop import process 160 handles a data fetch from the RDBMS 120 to the big data platform 130. In FIG. 4, the big data platform 130 can use the Sqoop import process 160 to import data from a selected table 129 (or a selected index, or a selected view) into the big data platform 130, a Hadoop Cluster. The RDBMS 120 can have an optimizer 123, also known as a query optimizer, designed to determine a most efficient way to execute a given query by considering possible query plans and corresponding costs. Additionally or alternatively, the RDBMS 120 can have a catalog 125 for storing historically executed queries, results and other data relevant to query executions. Additional detail regarding how to use the optimizer 123 and/or the catalog 125 will be provided below with reference to FIGS. 6 and 7.

The RDBMS 120 can comprise a database 127 that can have the selected table 129. The selected table 129 can be a collection of related data held in a structured format with in the database 127. The database 127 can use the selected table 129 to store target table data that the Sqoop import process 160 selects to transfer to the big data platform 130. Although shown and described as having one selected table 129 for purposes of illustration only, the database 127 can have any number of tables 129 for storing table data.

Although shown and described as having the optimizer 123 and the catalog 125 for purposes of illustrating the RDBMS 120 only, the RDBMS 120 can have other tools for purposes of managing and/or maintaining the database 127.

At 161, the Sqoop import process 160 can query the RDBMS 120 for a partitioned execution scheme. In some exemplary embodiments, the query can be directed to the optimizer 123 for a query explain plan or to the catalog 125 for certain statistical data. In some other embodiments, the RDBMS 120 can return the queried results as the partitioned execution scheme. In some alternative embodiments, the RDBMS 120 can incorporate certain optimization rules with the queried results to generate the partitioned execution scheme. In some other alternative embodiments, the query to the RDBMS 120 and the generating of the partitioned execution scheme can be conducted automatically by the Sqoop import process 160. Alternatively or additionally, a user can create the partitioned execution scheme and/or partitioned queries with or without consulting the RDBMS 120. Detail regarding user created partitioned queries will be shown and discussed below with reference to FIG. 10. In another alternative embodiment, when the Sqoop import process 160 queries the RDBMS 120 for the purposes of acquiring the partitioned execution scheme, a partition degree can be passed as a query parameter. Detail regarding acquiring the partition degree will be shown and described with reference to FIG. 5.

Although shown and described as using the Sqoop import process 160 for purposes of illustration only, any other suitable processes can also be used to conduct the fetch operations, including, but not limited to, any computer applications and/or any manual processes.

The big data platform 130 shown in FIG. 4 can be a Hadoop cluster 130. The Hadoop, often know as Apache Hadoop, is an open-source framework for distributed storage and distributed processing of big data on computer clusters built from commercially-available hardware. The Hadoop can comprise a storage part, namely a Hadoop Distributed File System ("HDFS"), and a processing part, namely a MapReduce (not shown). With the HDFS, the Hadoop can split the big data into relatively smaller chunks and distribute them amongst nodes in the Hadoop cluster 130. The MapReduce can transfer packaged code for nodes to process them in parallel automatically, a process known as "reduce".

In FIG. 4, the HDFS can have four nodes 135A-D. Each of the four nodes can be processed by one of a four Sqoop jobs 133A-D that can be processed in a separate process or thread. The Sqoop import process 160 can create one mapper, e.g. a JDBC mapper, per each of the partitioned queries, being directed to each of the four nodes 135A-D. The Sqoop import process 160 can initiate the mapper via at least one method of the mapper with partition boundaries for executing each of the partitioned queries. The Sqoop import process 160 can set the mapper jobs as map-only via a method of the mapper, which method can be different from the method for setting the boundaries of the partitions. Each of the Sqoop jobs needs no further reduce because the partition information can be already set in the mapper. Thereby, the Sqoop import process 160 can execution the map-only jobs with the big data platform 130, at 163.

As an exemplary example, in FIG. 4, the four Sqoop jobs (or maps) 133A-D can be triggered in a parallel manner, each Sqoop job conducting a transfer of a data partition defined by that respective map. Alternatively or additionally, at least part of the Sqoop import process 160 can involve manual intervention for generating the partitioned execution scheme or for executing each of the partitioned queries based on the partitioned execution scheme.

Although shown and describe as using the Hadoop for purposes of illustration only, other suitable big data platform 130 can be employed in the table data transfer, including, but not limited to, Spark.

Figure 5:
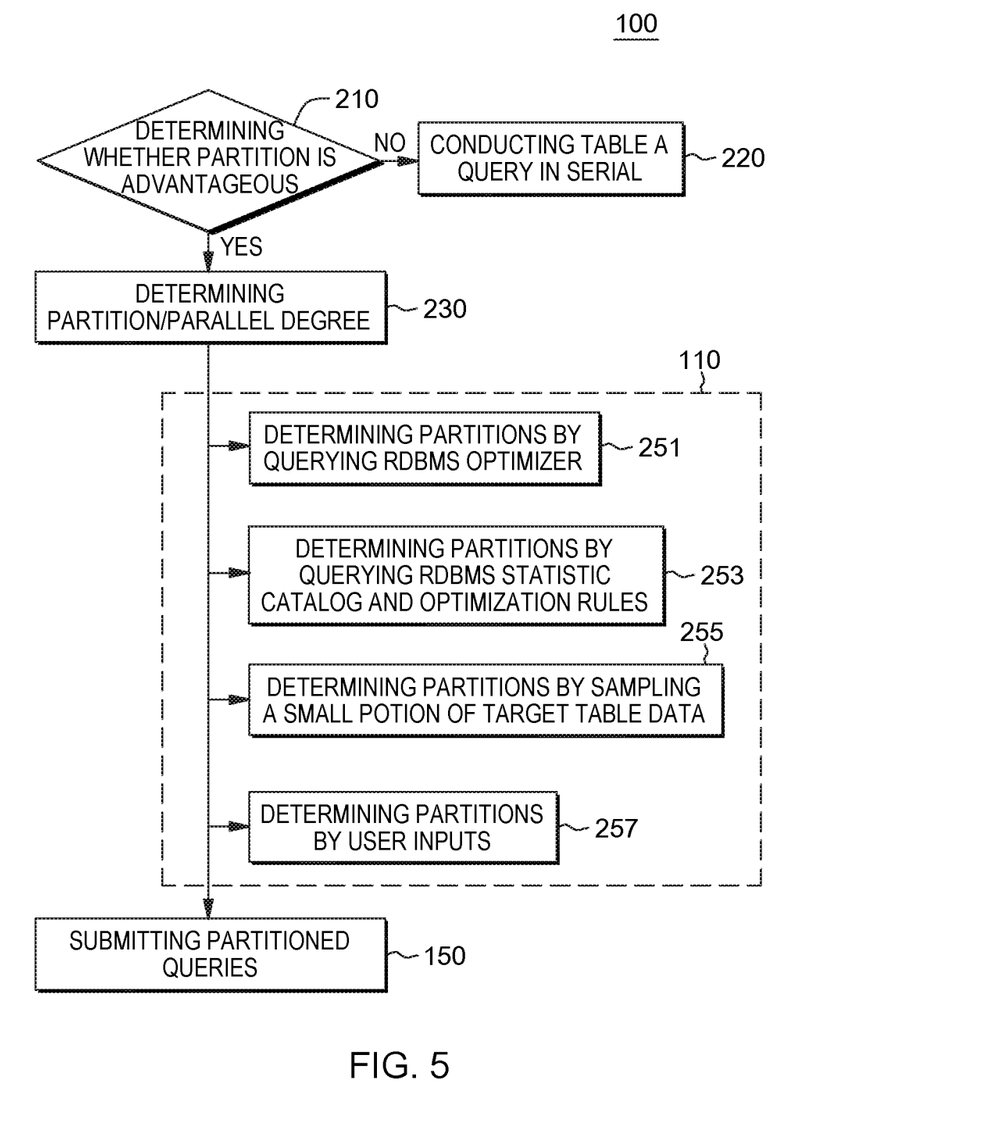
FIG. 5 is an exemplary flowchart illustrating another alternative embodiment of the method of FIG. 1, wherein four optional approaches are provided for acquiring the partitioned execution scheme.

FIG. 5 illustrates anther exemplary embodiment of the method 100, wherein a partitioned execution scheme is determined via at least one of four optional approaches (or four options) 251, 253, 255 and 257. In FIG. 5, as shown and described above with reference to FIG. 2, whether a partitioned data query of a selected table is advantageous can be determined at 210. If the method 100 determines that the partitioned fetch is not advantageous, the selected table can be fetched in a serial manner, at 220.

However, when the partitioned query of the selected table is advantageous, a partition degree (or parallel degree) can be determined, at 230, as an optional step before a partitioned execution scheme can be acquired at 110. In some embodiments, the partition degree can be decided by a number of parallel tasks that the big data platform 130 (shown in FIG. 3) can handle effectively. In other embodiments, the number of parallel tasks can be decided by a number of CPU cores of the big data platform 130. Alternatively or additionally, the number of parallel tasks can be determined by querying an RDBMS 120, e.g. the optimizer 123 (collectively shown in FIG. 4) of the RDBMS 120. In some other embodiments, the number of parallel tasks can be decided by considering both the number of CPU cores of the big data platform 130 and the query result from the RDBMS 120.

As shown and described above with reference to FIG. 2, the partitioned execution scheme can be acquired, at 110, which can include, but is not limited to, one or more partitioning columns and boundary values for each partition. FIG. 5, shows four optional approaches for acquiring the partitioned execution scheme. In some embodiments, at least one approach is selected for determining the partitioned execution scheme. The selection of the optional approaches can be conducted by user preference or by user's experience and/or knowledge regarding a selected table, a configuration, historic statistics of the selected table and/or the RDBMS 120. Alternatively or additionally, the selection can be based on a query result from the RDBMS 120.

At 251, the partitioned execution scheme can be determined by querying the optimizer 123 (shown in FIG. 4) of the RDBMS 120. The query to the optimizer 123 can include, but is not limited to, information contained in a query for target table data of the selected table and/or the partition degree. Querying the optimizer 123 can be more cost-efficient than querying the selected table, because the optimizer 123 can have a smaller data size and the query to the selected table can involve in expensive sorting. The optimizer 123 can provide valuable information regarding the partitioned execution scheme based on, e.g., previously executed queries and results.

At 253, the partitioned execution scheme can be determined by querying the statistics catalog 125 (shown in FIG. 4) and optimization rules of the RDBMS 120. The query to the statistics catalog 125 can include, but is not limited to, information contained in the query for target table data of the selected table and/or the partition degree. For similar reasons as described regarding the query to the optimizer 123, querying the statistics catalog 125 and optimization rules can be more cost-efficient than querying the selected table.

In addition, the statistics catalog 125 and optimization rules can also provide valuable information regarding the partitioned execution scheme based on previously executed queries and the optimization rules.

At 255, the partitioned execution scheme can be determined by querying a small sample of target table data of the RDBMS 120. The sampled query to the target table data can include, but is not limited to, information contained in the query for target table data of the selected table, sampling criteria and/or the partition degree. Because of a limited amount of the sampled data, a cost of querying the small sample can be limited compared to a table query-in-serial. A query result based on the small sample can be not as precise as a result based on a table query-in-serial. However, the query result can provide valuable information about how data is distributed with the selected table and can be valuable for generating the partitioned execution scheme.

At 257, the partitioned execution scheme can be determined by user input. The user input approach can combine query results from the RDBMS 120 and the user's knowledge and experience with the selected table, the RDBMS 120 and/or the big data platform 130. Thereby, the user input approach can be cost-efficient and valuable for constructing the partitioned execution scheme.

Additional detail regarding acquiring the partitioned execution scheme via any of the four optional approaches will be shown and described below with reference to FIGS. 6-10. Although shown and described as being the four optional approaches for determining the partitioned execution scheme for purposes of illustration only, other suitable queries to the RDBMS 120 or to the big data platform 130 can also be implemented in a process of determining the partitioned execution scheme. Alternatively or additionally, any combination of the optional approaches, with or without any other approaches, can be used to determine the partitioned execution scheme.

Partitioned queries can be constructed based on the partitioned execution scheme and be submitted to the RDBMS 120, at 150, in a same manner as shown and described with reference to FIG. 4. The partitioned queries can be executed in a parallel manner to ensure a performance of the data fetch operation and to avoid stragglers in case of an uneven data distribution because the partitioned queries reflect distribution characteristics of the target table data.

Figure 6:
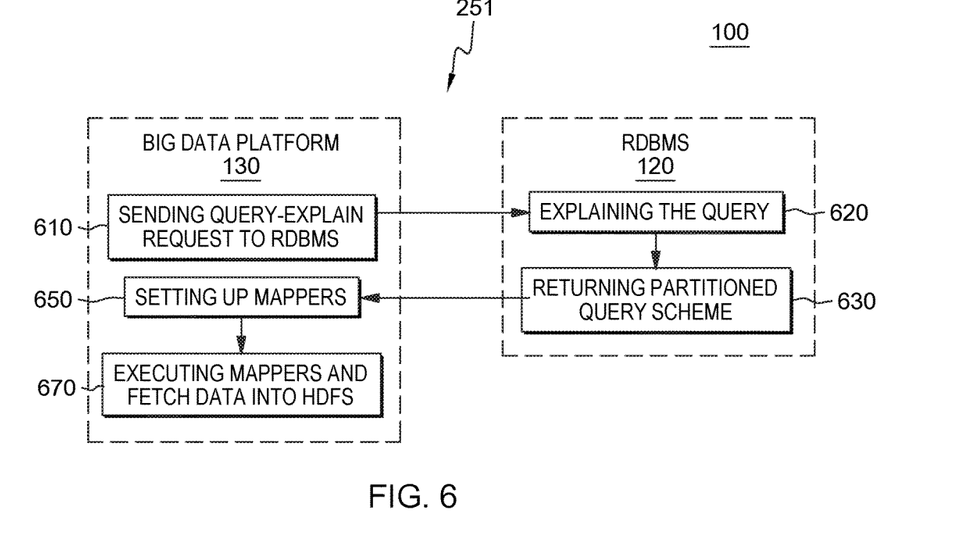
FIG. 6 is an exemplary flowchart illustrating an embodiment of the method of FIG. 5, wherein querying to an optimizer of the RDBMS is illustrated as one of the four optional approaches of FIG. 5.

FIG. 6 illustrates an exemplary embodiment of the step 251 of the method 100 of FIG. 5. Turning to FIG. 6, the big data platform 130 consults the optimizer 123 (shown in FIG. 4) of the RDBMS 120 to determine a partitioned execution scheme. In FIG. 6, the big data platform 130 can send a query explain request to the optimizer 123 of the RDBMS 120, at 610. The query-explain request can comprise a query for retrieving target data of a selected table and other information, e.g. a partition degree. Taking SQL as an exemplary example, the query can be a SQL SELECT query that can include, but is not limited to, the selected table name (or view name), one or more columns if interest and a predicate clause introduced by a WHERE keyword. The predicate clause can be used to specify criteria for limiting a number of rows selected by the SELECT query, e.g. the criteria can define a range of rows in the selected table. In some embodiments of the RDBMS 120, the query-explain request can be easily submitted by prefixing the query with a command keyword, such as EXPLAIN or EXPLAIN QUERY PLAN.

In some embodiments, the optimizer 123 can optionally check the statistics catalog 125 (shown in FIG. 4) of the RDBMS 120 before executing the query-explain request. If the query has been previously explained, there can be a possibility that an explain plan still exists in a cache of the RDBMS 120. In that case, the optimizer 123 can get the cached explain plan and a cost of re-executing the query-explain request can be avoid. Additional detail regarding searching the catalog 125 for previously query results will be discussed below with regard to FIG. 7.

After the optional step of checking the statistics catalog 125, the query optimizer 123 can decide to execute the query-explain request. The optimizer 123 can explain the query, at 620, for purposes of devising an optimal plan (or explain plan) for executing the query. Most RDBMS 120 systems, if not all, can have at least one optimizer 123 for purposes of determining a most efficient execution plan for any queries, including data retrieve queries. The optimizer 123 can generate the execution plan based on statistical data collected related to the target data of the selected table and by leveraging database features. The execution plan can be a plan for a query-in-serial or a partitioned execution scheme that can be useful for parallel task execution of fetching data from the RDBMS 120 to the big data platform 130.

At 630, when the explain plan is a partitioned execution scheme, the RDBMS 120 can return the partitioned execution scheme to the big data platform 130 as a response to the query-explain request. The partitioned execution scheme can be returned via a wired or wireless connection (not shown), including, but not limited to, the any kind of Local Area Networks ("LAN"), Wide Area Networks ("WAN"), the Internet or the like. Optionally, at 630, the RDBMS 120 can also return also return the execution plan when the execution plan is a query-in-serial.

At 650, the big data platform 130 can set up partition mappers for each of the partitions defined in the partitioned execution scheme. At 670, the big data platform 130 can start the fetch tasks defined with each of the partition mappers. The RDBMS 120 can start transferring target table data requested in each of the partition mapper to a corresponding node of the big data platform 130. The setting of the mappers and the executing the partitioned queries can be conducted in a same manner shown and described above with reference to FIG. 4.

Although shown and described as using partition mappers for executing the partitioned queries for purposes of illustration only, other suitable mechanisms or database connectivity tools can be implemented and/or utilized for executing the partitioned queries.

Figure 7:
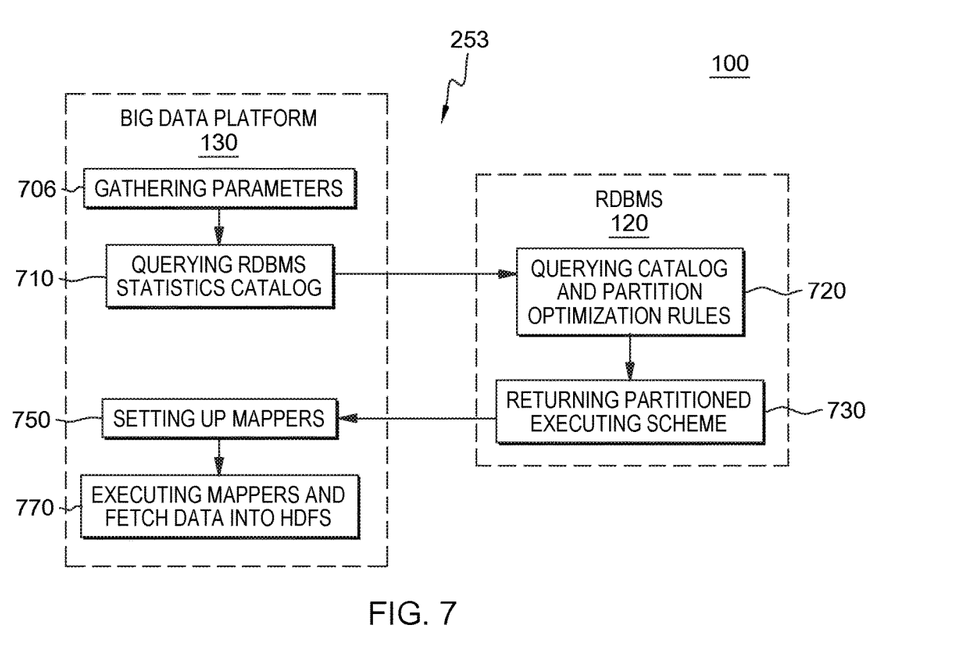
FIG. 7 is an exemplary flowchart illustrating another embodiment of the method of FIG. 5, wherein querying to a statistics catalog of the RDBMS is illustrated as one of the four optional approaches of FIG. 5.

FIG. 7 illustrates an exemplary embodiment of the step 253 of the method 100 of FIG. 5. Turning to FIG. 7, the big data platform 130 consults the statistics catalog 125 (shown in FIG. 4) of the RDBMS 120 to generate a partitioned execution scheme. In FIG. 7, the big data platform 130 can gather certain parameters for a statistics catalog 125 query. For purposes of illustration but not for purposes of limitation, the parameters can include a partition degree acquired from the big data platform 130. In some embodiments, as shown and described with reference to FIG. 5, the partition degree can be decided by either a number of CPU cores of the big data platform 130 or by querying the RDBMS 120. Alternatively or additionally, the number of parallel tasks can be decided by considering both of the number of CPU cores of the big data platform 130 and the query result from the RDBMS 120.

At 710, the big data platform 130 can query the statistics catalog 125 of the RDBMS 120. The statistics catalog 125 can holds metadata of the RDBMS 120 and historic query data to tables of the RDBMS 120. The historic query data can include, but is not limited to, executed queries, execution plans for the executed queries, execution results for the executed queries and execution costs for the executed queries.

In response to the query to the catalog 125, the RDBMS 120 can execute the query for searching historic execution records and/or statistic data from the statistics catalog 125, at 720. Alternatively or additionally, the RDBMS 120 can also consult certain partition optimization rules defined in the RDBMS 120 and analyze the historic execution records and/or statistic data in consideration of the partition optimization rules to generate the partitioned execution scheme. The partition optimization rules can include, but are not limited to, index rules, preferred partitioning columns, existing table partition schemes and the like.

As shown and discussed with reference to FIG. 6, the RDBMS 120 can return the partitioned execution scheme to the big data platform 130 as a response to the query, at 730. The partitioned execution scheme can include, but is not limited to, one or more partitioning columns and boundary values for each partition. Alternatively or additionally, the partitioned execution scheme can include a distribution of target table data, which can be used to decide partitions with balanced data amount. The partitioned execution scheme can be returned in a same manner as shown and described with reference to FIG. 6.

At 750, the big data platform 130 can set up partition mappers for each of the partitions defined in the partitioned execution scheme in a same manner shown and described above with reference to FIG. 6. At 770, the big data platform 130 can start the fetch tasks defined with each of the partition mappers. The RDBMS 120 can start transferring target table data requested in each of the partition mapper to a corresponding mapped node of the big data platform 130.

Figure 8:
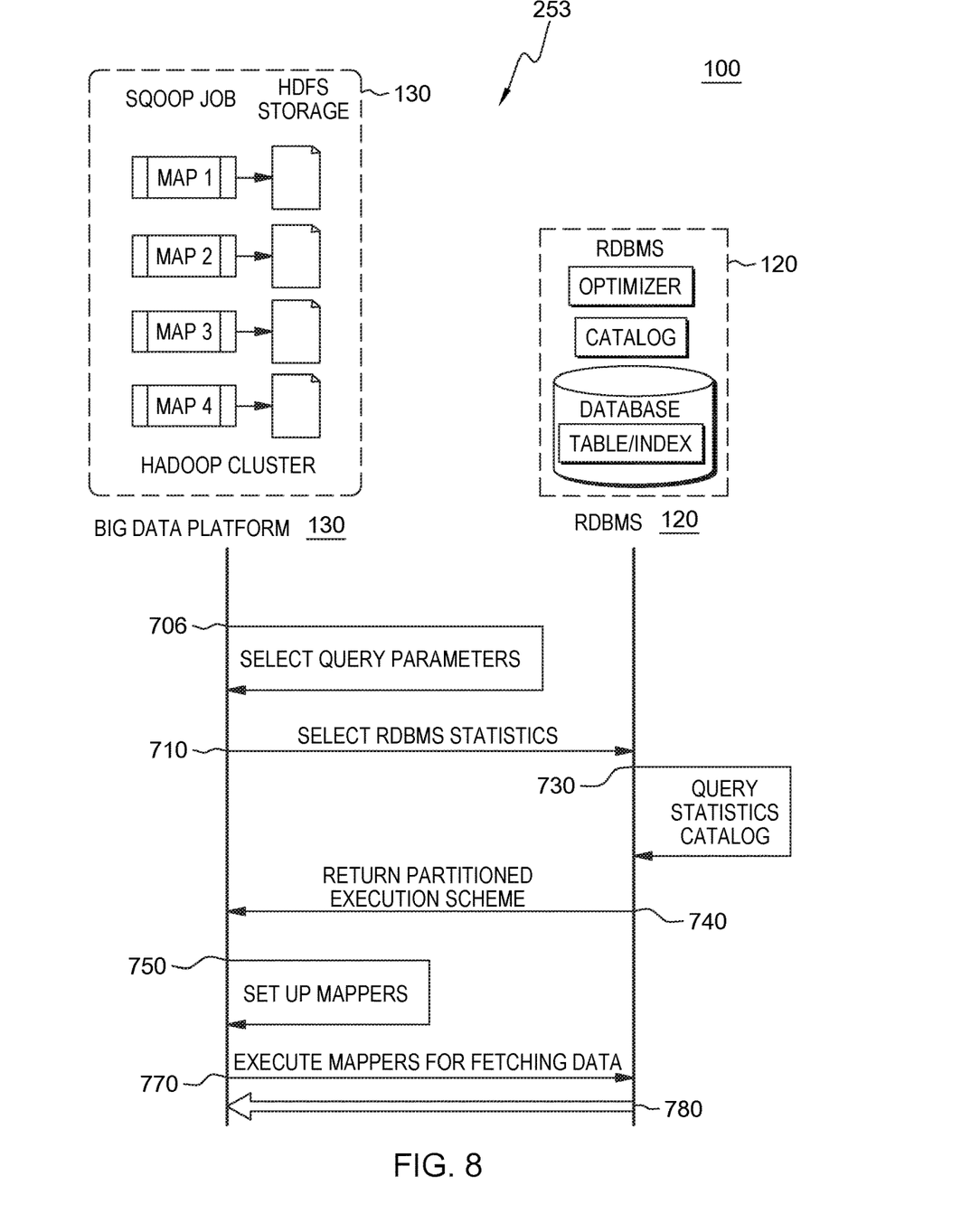
FIG. 8 is an exemplary dataflow diagram of a partitioned fetch from an RDBMS to a big data platform in accordance with an embodiment of FIG. 7.

FIG. 8 illustrates an exemplary data flow diagram of a partitioned data fetch, with partitioned queries, from the RDBMS 120 to the big data platform 130 in accordance with an embodiment of FIG. 7. The data fetch can begin, at 706, with a process, e.g. the Sqoop import process 160, running on the big data platform 130 for selecting certain query parameters for a query to the statistics catalog 125 (shown in FIG. 4). The parameters can include, but are not limited to, a selected table, certain boundary values for one or more column, a time range for the query and an optional partition degree. The process can construct the query with the selected parameters and submit the query, at 710, to the RDBMS 120.

At 730, having received the query, the RDBMS 120 can execute the query by searching statistical data available in the statistics catalog 125. Next, still at 730, the RDBMS 120 can pick out the statistical data that complies with the criteria set in the query. In some embodiments, the RDBMS 120 can return the selected statistical data in a format of a partitioned execution scheme, at 740. In some alternative embodiments, the RDBMS 120 can consult certain relevant optimization rules based on the criteria from the catalog 125 or other resource of the RDBMS 120, e.g. an optimizer 123. The RDBMS 120 can analyze the statistical data with the relevant optimization rules to generate the partitioned execution scheme that can be returned to the big data platform 130, at 740.

At 750, the big data platform 130 can set up partition mappers for each of the partitions defined in the partitioned execution scheme. At 770, the big data platform 130 can start the fetch tasks defined with each of the partition mappers. The RDBMS 120 can start transferring target table data requested in each of the partition mapper to a corresponding node of the big data platform 130, at 780. The setting of the mappers and the executing the partitioned queries can be conducted in a same manner shown and described above with reference to FIG. 4.

Additionally or alternatively, other data transfers between the RDBMS 120 and the big data platform 130 can also be involved under this disclosure, including, but not limited to, control data for purposes of authentication and/or authorization.

Figure 9:
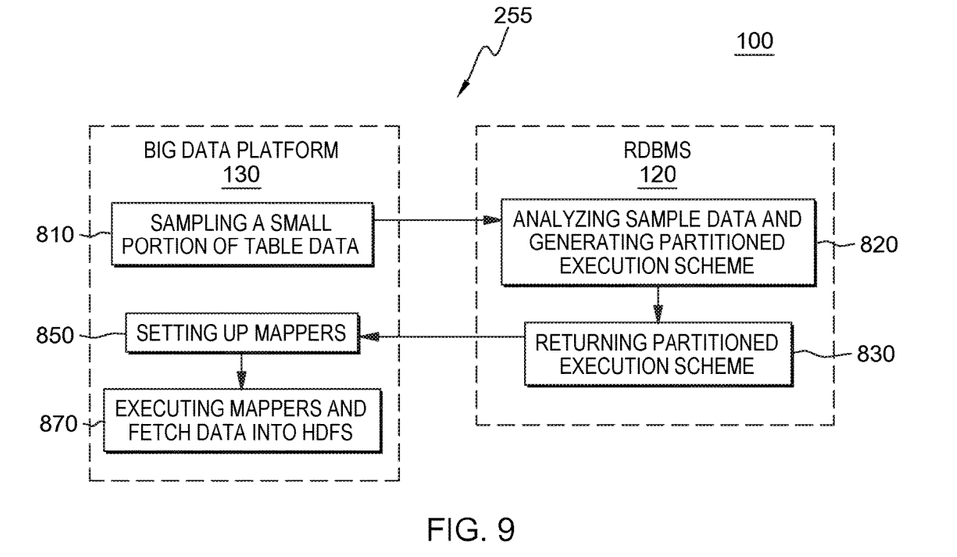
FIG. 9 is an exemplary flowchart illustrating another embodiment of the method FIG. 5, wherein sampling a small portion of target table data of the RDBMS is illustrated as one of the four optional approaches of FIG. 5.

FIG. 9 illustrates an exemplary embodiment of the step 255 of the method 100 of FIG. 5. Turning to FIG. 9, a small portion of target table data is sampled for generating a partitioned execution scheme. In FIG. 9, at 810, the big data platform 130 can define the small portion of the target table data by a predicate clause that can be included in a pre-execution query to the RDBMS 120. In some exemplary embodiments, the sampled data query can be similar to a query that is supposed to be used to fetch the target table data, with only additional criteria to limit a data amount. In some embodiments, the target table data can be sampled within a range of equal or greater than one percent to equal or less than five percent of an amount of the target data. The sampled data can be randomly selected from the target table data or be selected in accordance with certain rules. Because of a limited amount of the sampled data, a cost of the pre-execution query to the sample data can be limited compared to a pre-execution query targeted on the target table data.

The RDBMS 120 can execute the pre-execution query with the small sample, at 820. The RDBMS 120 can analyzed the sampled data and generate a partitioned execution scheme based on a distribution of the sampled data. Additionally or alternatively, when generating the partitioned execution scheme, the partition optimization rules shown and described with reference to FIG. 7 can also be consulted. As shown and described with reference to FIGS. 6 and 7, the RDBMS 120 can return the partitioned execution scheme to the big data platform 130, at 830, as a response to the pre-execution query to the sampled data.

At 850, the big data platform 130 can set partition mappers for each of the partitions defined in the partitioned execution scheme. At 870, the big data platform 130 can start executing the fetch tasks defined with each of the partition mappers. The RDBMS 120 can start transferring target table data requested in each of the partition mapper to a corresponding mapped node of the big data platform 130. The setting of the mappers and the executing the partitioned queries can be conducted in a same manner shown and described above with reference to FIG. 4.

Figure 10:
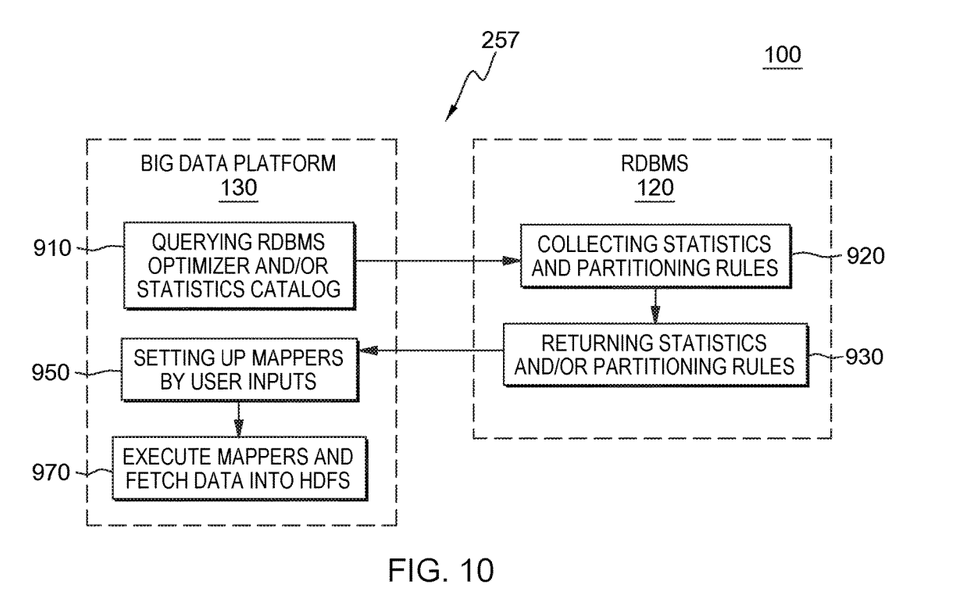
FIG. 10 is an exemplary flowchart illustrating another embodiment of the method FIG. 5, wherein inputting user selections is illustrated as one of the four optional approaches of FIG. 5.

FIG. 10 illustrates an exemplary embodiment of the step 257 of the method 100 of FIG. 5. Turning to FIG. 10, the big data platform 130 generates a partitioned execution scheme based on user selected partitioning columns and/or boundary values for each partition. In FIG. 10, in some exemplary embodiments, the big data platform 130 can query the statistics catalog 125 (shown in FIG. 4) of the RDBMS 120, at 910, for historic statistics data regarding queries executed against a selected table, as shown and described above with reference to FIG. 7. Alternatively or additionally, the big data platform 130 can query the query optimizer 123 (shown in FIG. 4) of the RDBMS 120 in order to get a explain plan, as shown and described above with reference to FIG. 6.

The RDBMS 120 can collect the queried statistics from the statistics catalog 125 of the RDBMS 120, at 920. Alternatively or additionally, when the optimizer 123 is queried, the RDBMS 120 can also consult the optimizer 123 for the explain plan, at 920. The RDBMS 120 can return the queried statistics and/or the explain plan to the big data platform 130 as a response to the queries, at 930.

Different from solutions shown and described with reference to FIGS. 6 and 7, at 950, the user can set up partition mappers with his/her own input, including but not limited to, one or more partitioning columns and/or boundary values for each partition. The user can refer to the queried results, including the queried statistics and/or the explain plan. Alternatively or additionally, the user can choose not to perform any query to the RDBMS 120 and choose to set up the partition mappers based solely on his own knowledge and/or experience regarding the selected table, the RDBMS 120 and/or the big data platform 130. Although shown and described as using the queried statistics and/or the explain plan for purposes of illustration, other parameters regarding the RDBMS 120 or the big data platform 130 can be queried to assist the user inputs.

When the mappers are set, the big data platform 130 can start tasks for the partitioned queries, at 970, in a manner shown and described with reference to FIG. 4.

Figure 11:
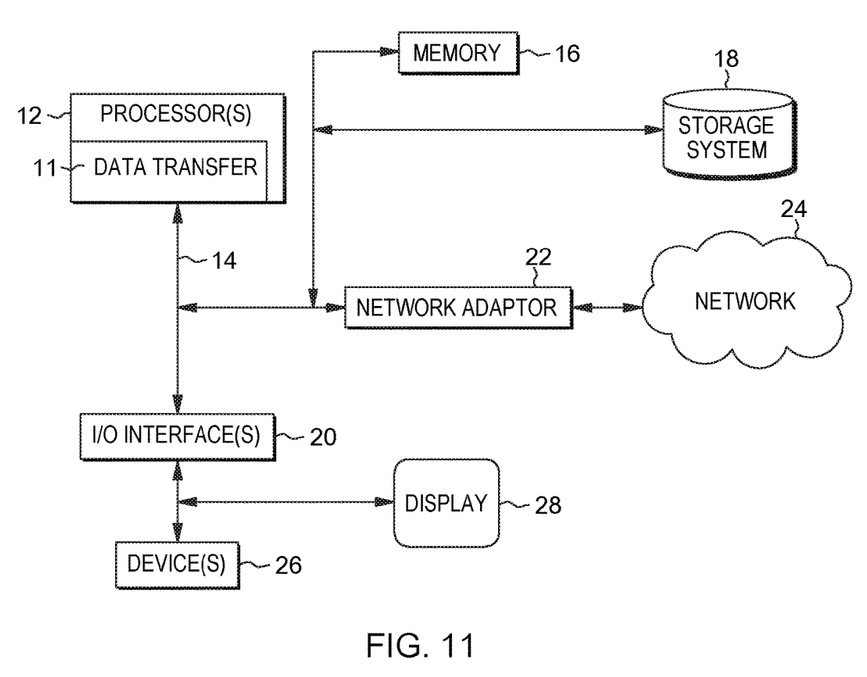
FIG. 11 illustrates a schematic of an example computer or processing system that may implement a data transfer system in one embodiment of the present disclosure.

FIG. 11 illustrates a schematic of an example computer or processing system that may implement the data transferring in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 11 that performs the methods described herein. The module 11 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for transferring data from a Relational Database Management System ("RDBMS") to a big data platform, comprising:
submitting, by a processor to the RDBMS, a request with a partition degree to generate a parallel query plan relating to a selected table, wherein the partition degree is based on a number of parallel tasks of the big data platform;
acquiring, by the processor, a partitioned execution scheme of the selected table from the RDBMS, the acquiring comprising obtaining statistics related to the selected table from a statistics catalog of the RDBMS and determining the partitioned execution scheme for the selected table based on the statistics;
generating, by the processor, partitioned queries, with partition mappers, based on said acquired partitioned execution scheme; and
submitting, by the processor, the generated partitioned queries to the RDBMS to transfer the selected table to the big data platform via the partition mappers in parallel with multiple tasks.

2. The method of claim 1, further comprising determining, by the processor, the partition degree according to the number of parallel tasks of the big data platform.

3. The method of claim 1, wherein said acquiring the partitioned execution scheme further comprises sampling target table data of the selected table.

4. The method of claim 3, wherein said acquiring the partitioned execution scheme comprises determining the partitioned execution scheme based on said sampling.

5. The method of claim 1, wherein said acquiring the partitioned execution scheme comprises defining the partitioned execution scheme by user inputs.

6. The method of claim 1, wherein said submitting the partitioned queries comprises sending the partitioned queries via the mappers, each corresponding to a partition, for parallel transfers.

7. The method of claim 1, wherein said acquiring the partitioned execution scheme comprises choosing one or more columns for partitioning the selected table and determining boundary values for each partition.

8. The method of claim 7, wherein said choosing the columns comprises choosing a number of leading columns of the selected table or a defined index of the selected table according to an optimization rule being designed according to a partitioning type of the selected table.

9. The method of claim 1, further comprising determining whether the transferring with the partitioned queries is advantageous based on a presence of a defined index of the selected table.

10. A system for transferring data, comprising:
a relational database with one or more query engines for executing parallel queries;
one or more big data platforms for storing big data in a distributed configuration; and
at least one processor and memory storing instructions that, when executed by the at least one processor, cause the at least one processor to execute a connectivity driver that is configured to fetch a selected table from the RDBMS, or from a result of a query to the RDBMS, to the one or more big data platforms,
wherein the selected table is transferred to the big data platform in parallel with multiple tasks, and
wherein the connectivity driver is configured to send a request with a partition degree to the RDBMS to generate a parallel query plan relating to a selected table before said parallel transfer, wherein the partition degree is based on a number of parallel tasks of the one or more big data platforms, and to consult the RDBMS, the at least one processor is configured to:
obtain statistics related to the selected table from a statistics catalog of the RDBMS and determining the partitioned execution scheme based on the statistics, the connectivity driver configured to generate partitioned queries based on the partitioned execution scheme and submit the partitioned queries to the RDBMS to transfer the selected table to the big data platform in parallel with multiple tasks.

11. The system of claim 10, wherein said partitioned execution scheme is determined based selected one or more partitioning columns and selected boundary values, both being selected by a user.

12. The system of claim 10, wherein said partitioned execution scheme comprises one or more columns for partitioning a selected table and boundary values of the columns for each partition.

* * * * *